Nov. 10, 1925.

M. BEMBINA 1,561,401

GRATER

Filed Dec. 30, 1924  2 Sheets-Sheet 1

WITNESSES
H. J. Walker
G. B. Marshall

INVENTOR
M. Bembina
BY
ATTORNEYS

Nov. 10, 1925.  
M. BEMBINA  
GRATER  
Filed Dec. 30, 1924  
1,561,401  
2 Sheets-Sheet 2

Patented Nov. 10, 1925.

1,561,401

UNITED STATES PATENT OFFICE.

MELCHIORRE BEMBINA, OF PALERMO, ITALY, ASSIGNOR OF ONE-HALF TO DOMENICO GUIDO VERNACI, OF NEW YORK, N. Y.

GRATER.

Application filed December 30, 1924. Serial No. 758,922.

*To all whom it may concern:*

Be it known that I, MELCHIORRE BEMBINA, a subject of the Kingdom of Italy, and a resident of Palermo, Italy, have invented a new and Improved Grater, of which the following is a full, clear, and exact description.

My invention has for its object to provide a cheap and efficient grater which may be used for grating cheese and other material, the grater having preferably a removable member with a grating surface, which permits of the replacement of the member when desired and which also enables the user to cleanse the member without inconvenience.

Another object of the invention is to provide a cylindrical grater member within which is disposed a container having means for pressing material against the cylindrical grater member.

Still other objects of the invention are to provide the various parts in such form that they may be readily taken apart and assembled and to provide means which permits of the convenient introduction into the container of the material which is to be grated.

Additional objects will appear in the following specification, in which the preferred form of the invention is described.

Similar reference characters refer to similar parts in all the views, in which—

Figure 1:
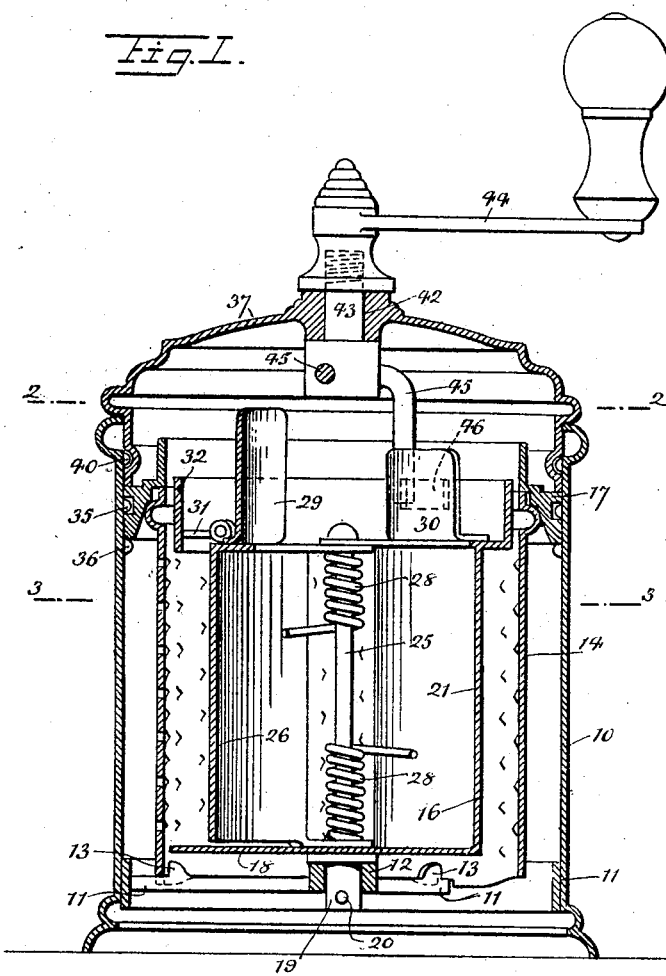
Figure 1 is a sectional elevation of the invention.

By referring to the drawings, it will be seen that a casing 10 is provided having radially disposed arms 11 at its bottom, these arms carrying a bearing 12. As will be seen by referring to Figure 1 of the drawings, the arms 11 are provided with lugs 13. Disposed in the casing 10, there is a cylindrical grater member 14, the cylindrical grater member 14 having recesses 15 at its bottom which fit the arms 11, the cylindrical grater member 14 being disposed at the outer sides of the lugs 13. This serves to hold the bottom of the cylindrical grater member 14 in position, while permitting its removal when desired. Disposed in the cylindrical grater member 14, there is a container 16, and disposed around and on the cylindrical grater member 14, there is a ring 17, it being understood that the ring 17 may be readily removed from the casing 10, which permits of the ready removal of the container 16 and the cylindrical grater member 14. The container 16 has a bottom 18, from which depends a stud 19, which is journaled in the bearing 12, this stud 19 being preferably held in the bearing 12 by a pin 20.

Extending up from the bottom 18 of the container 16, there is a side wall 21, which has a curved portion 22. This side wall 21 has a vertical reinforcing rib 23 and horizontal reinforcing flanges 24. The container is also provided with a pivot 25, on which is mounted a pusher arm 26, this pusher arm 26 serving to push the material 27 which is to be grated outwardly against the cylindrical grater member 14. Springs 28 are mounted on the pivot 25 which have terminals which engage the side wall 21 and the pusher arm 26 for moving the pusher arm 26 to press the material 27 to be grated against the cylindrical grater member 14. There is a finger member 29 on the pusher arm 26 and there is a finger member 30 on the side wall 21, by means of which the pusher arm 26 may be pressed inwardly against the resiliency of the springs 28 to permit of the insertion of the material 27 between the pusher arm 26 and the cylindrical grater member 14. Pivoted on the pusher arm 26, there is a finger 31 which when in a horizontal position engages the rim 32 of the container to limit the outward movement of the pusher arm 26, it being possible, however, to raise the finger 31 so that the pusher arm 26 may be moved outwardly a greater distance under the influence of the springs 28.

Figure 4:
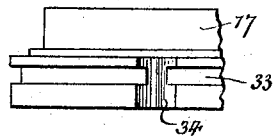
Figure 4 is an enlarged fragmentary view of the ring.
Figure 5:
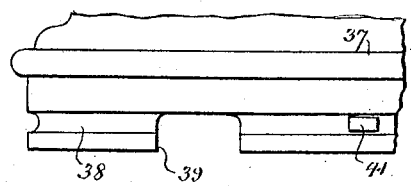
Figure 5 is an enlarged fragmentary view of the cover.
Figure 2:
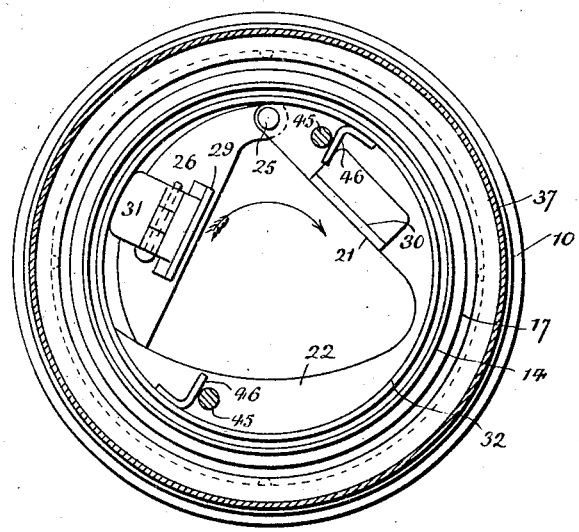
Figure 2 is a sectional view on the line 2—2 of Figure 1.
Figure 3:
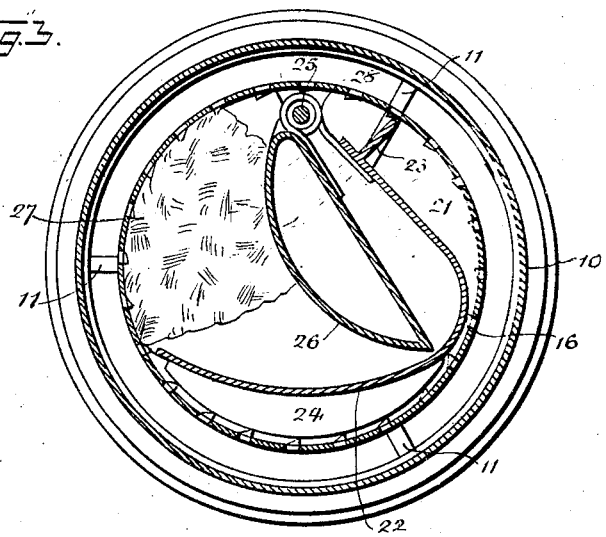
Figure 3 is a sectional view on the line 3—3 of Figure 1.

As will best be seen by referring to Figure 4 of the drawings, the ring 17 has an annular guideway 33 with vertical slots 34, so that the ring may be disposed with its slots 34 at the guides 35, when it may be pressed downwardly against the cylindrical member 14 and the rests 36, after which the ring 17 may be rotated so that the guides 35 will travel in the annular guideway 33.

The cover 37 has an annular guideway 38 with cut-away portions 39, so that the cover 37 may be disposed with its cut-away portions 39 at the guides 40, when the cover may be pressed downwardly on the casing until it abuts against the ring 17, when the cover 37 may be rotated with the guides 40 traveling in the annular guideway 38. There is a stop 41 in this guideway 38 so that the rotary movement of the cover 37 relatively to the casing 10 is limited. The cover 37 is provided with a bearing 42, in which a stud 43 is journaled, a crank 44 being secured to the stud 43 above the cover 37. Arms 45 depend from the stud 43 for engagement with the lugs 46, which extend upwardly from the container 16.

From the above, it will be readily understood that when the crank 44 is rotated, the engagement of the arms 45 with the lugs 46 will serve to rotate the container 16 relatively to the cylindrical grater member 14, and when material 27 is disposed between the pusher arm 26 and the cylindrical grater member 14 this material 27 will be grated, the grated material passing between the cylindrical grater member 14 and the casing 10 out of the bottom of the casing.

When it is desired to cleanse or replace the cylindrical grater member 14, the cover may be removed, after which the ring 17 may be removed, when the container 16 may be removed from the casing, after which the cylindrical grater member 14 may be removed from the casing 10.

Having thus described my invention, I claim:

1. In a grater, a casing, a grater member removably disposed in the casing, a container member disposed within the casing and having means for advancing material against the grater member, and means to move one member relatively to the other member.

2. In a grater, a casing, a cylindrical grater member disposed in the casing, a container member disposed in the cylindrical grater member and having means for advancing in the direction of the cylindrical grater member material to be grated, and means for rotating one member relatively to the other.

3. In a grater, a cylindrical grater member, a container disposed in the cylindrical grater member, a pusher member on the container for pushing material to be grated against the cylindrical grater member, and means for rotating the container relatively to the cylindrical grater member.

4. In a grater, a cylindrical grater member, a container member having a bottom and a side wall for supporting material to be grated, a pusher member on the container member for advancing the material to be grated against the cylindrical grater member, and means for rotating one of the first two members relatively to the other.

5. In a grater, a cylindrical grater member, a container member having a bottom and a side wall for supporting material to be grated, a pusher arm pivoted to the container member for advancing the material to be grated against the cylindrical grater member, resilient means for actuating the pusher arm, and means to rotate one member relatively to the other.

6. In a grater, a cylindrical grater member, a container having a bottom and a side wall for supporting material to be grated, a pusher arm pivoted to the container for advancing the material to be grated against the cylindrical grater member, resilient means for actuating the pusher arm, finger pieces on the body of the container and the pusher arm for moving the pusher arm against the action of the resilient means, and means to rotate the container relatively to the cylindrical grater member.

7. In a grater, a casing, a cylindrical grater member disposed in the casing, a container having means for advancing material to be grated against the cylindrical grater member, the container being disposed in the cylindrical grater member, lugs on the container, a cover for the casing, and a crank mounted on the cover having arms for engaging the lugs which permits the crank to rotate the container.

8. In a grater, a casing having arms with lugs, a bearing mounted on the arms, a cylindrical grater member resting on the arms adjacent the lugs and having surfaces engaging the sides of the arms, a container disposed in the cylindrical grater member and having a stud journaled in the bearing, means on the container for advancing material to be grated against the cylindrical grater member, and means for rotating the container.

9. In a grater, a casing, a grater member disposed in the casing, means for holding the bottom of the grater member in position relatively to the casing, a ring engaging the top of the grater member and the casing for holding the top of the grater member in position, a container disposed in the casing, means in the container for advancing material to be grated against the grater, and means for moving the container relatively to the grater member.

10. In a grater, a casing, a cylindrical grater member removably disposed in the casing, means for holding the bottom of the cylindrical grater member in position relatively to the casing, a removable ring engaging the cylindrical grater member and the casing for holding the top of the cylindrical grater member in position, a container disposed in the cylindrical grater member and having means for advancing material to be grated against the cylindrical grater member, lugs on the container, a cover for the container provided with a bearing, and a crank journaled in the bearing having arms for engaging the lugs.

11. In a grater, a casing, a cylindrical grater member removably disposed in the casing, means for holding the bottom of the cylindrical grater member in position relatively to the casing, means for holding the top of the cylindrical grater member in position relatively to the casing, a container disposed in the cylindrical grater member, the container having a bottom and a side wall for supporting material to be grated, a pusher arm pivoted to the container for advancing the material to be grated against the cylindrical grater member, resilient means for actuating the pusher arm, lugs on the container, a cover for the container provided with a bearing, and a crank journaled in the bearing having arms for engaging the lugs.

MELCHIORRE BEMBINA.